United States Patent
Sikorski (10) Patent No.: US 11,919,457 B2
(45) Date of Patent: Mar. 5, 2024

(54) PASSENGER SEAT WIRE ROUTING

(71) Applicant: Safran Seats USA LLC, Gainesville, TX (US)

(72) Inventor: Jeffrey L. Sikorski, Anna, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/639,202

(22) PCT Filed: Aug. 30, 2019

(86) PCT No.: PCT/US2019/049025
§ 371 (c)(1),
(2) Date: Feb. 28, 2022

(87) PCT Pub. No.: WO2021/040730
PCT Pub. Date: Mar. 4, 2021

(65) Prior Publication Data
US 2022/0324397 A1  Oct. 13, 2022

(51) Int. Cl.
*B60N 2/02* (2006.01)
*B60R 16/02* (2006.01)
*B64D 11/06* (2006.01)

(52) U.S. Cl.
CPC ............ *B60R 16/0215* (2013.01); *B60N 2/02* (2013.01); *B64D 11/0624* (2014.12)

(58) Field of Classification Search
CPC ... B64D 11/0624; B60R 16/0215; B60N 2/20; B60N 2/3009
See application file for complete search history.

(56) References Cited

U.S. PATENT DOCUMENTS 8,772,636 B2 * 7/2014 Yamaguchi .......... H02G 3/0487
174/72 A
9,527,479 B2 * 12/2016 Schneider ............... B60R 99/00
(Continued)

FOREIGN PATENT DOCUMENTS

| CN | 108340819 A | * | 7/2018 | ............. B60N 2/682 |
| CN | 113442843 A | * | 9/2021 | ............... B60N 2/30 |

(Continued)

OTHER PUBLICATIONS

International Patent Application No. PCT/U82019/049025, International Search Report and Written Opinion, dated Jun. 25, 2020.
(Continued)

*Primary Examiner* — Timothy J Brindley
(74) *Attorney, Agent, or Firm* — Kilpatrick Townsend & Stockton LLP (57) ABSTRACT

A passenger seat includes a spreader frame structure and a seat back pivotally attached to the spreader frame structure. At least one cable can pass through apertures between the seat back and the spreader frame structure. The seat can rotate between an upright configuration wherein the seat back is in a deployed position, and a break over configuration wherein the seat back is in a stowed position. The length of the at least one cable between the aperture in the seat back and the aperture in the spreader frame structure is approximately the same in the upright configuration and in the break over configuration.

10 Claims, 5 Drawing Sheets

(56) References Cited

U.S. PATENT DOCUMENTS

| | | | |
|---|---|---|---|
| 10,348,076 B2 * | 7/2019 | Gallion | H02G 3/32 |
| 2012/0261527 A1 * | 10/2012 | Yamaguchi | B60R 16/0215 |
| | | | 248/68.1 |
| 2016/0297533 A1 | 10/2016 | Le et al. | |
| 2017/0001546 A1 * | 1/2017 | Keyser | B60N 2/2227 |
| 2018/0326882 A1 * | 11/2018 | Bach | B60N 2/2352 |
| 2019/0112051 A1 | 4/2019 | Finlay et al. | |
| 2020/0130844 A1 * | 4/2020 | Hahn | B60N 2/64 |
| 2022/0185158 A1 * | 6/2022 | Yamamoto | A47C 7/54 |

FOREIGN PATENT DOCUMENTS

| | | | |
|---|---|---|---|
| EP | 2523285 A1 | 11/2012 | |
| EP | 3121118 A1 | 1/2017 | |

OTHER PUBLICATIONS

Europe Patent Appl. No. 19768985.4, Office Action, dated Nov. 23, 2023.

* cited by examiner

PASSENGER SEAT WIRE ROUTING

FIELD OF THE INVENTION

The field of the invention relates to wire routing systems for passenger seats in aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs and/or arm rests of the passenger seats. While inclusion of these entertainment devices is prevalent and generally expected by many passengers, inclusion of these entertainment devices may nevertheless introduce challenges relating to additional cabling, connections, and other support infrastructure used to provide power and/or data to enable proper functioning of such devices.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a system for routing at least one cable for a passenger seat comprises a first aperture in a seat back of the passenger seat, a second aperture in a frame structure of the passenger seat, an upright configuration wherein the seat back is in a deployed position, and a break over configuration wherein the seat back is in a stowed position. The seat back may rotate approximately 90° in a forward direction from the upright configuration to the break over configuration.

In certain embodiments, the at least one cable passes through the first aperture and the second aperture, wherein the at least one cable has a first length between the first aperture and the second aperture when the seat back is in an upright configuration, and a second length between the first aperture and the second aperture when the seat back is in an upright configuration. The first length and the second length may differ by less than 5%. In further embodiments, the length of the at least one cable between the first aperture and the second aperture is approximately the same in the upright configuration and in the break over configuration. The first aperture and the second aperture may each be sized to accommodate at least two cables.

According to some embodiments, the first aperture comprises a slot. The slot may be less than 1 inch wide and greater than 2.5 inches long and/or may extend in a direction between a bottom of the seat back and a top of the seat back and/or may be approximately aligned with a pivot axis of the seat back. The first aperture may further comprise a grommet.

In certain embodiments, the second aperture may extend through a spreader cover and/or may comprise a flange extending away from a surface of the frame structure. The second aperture may further comprise an attachment member on an outer surface of the flange. The second aperture may be disposed approximately adjacent to an edge of the seat back when the system is in the upright configuration.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention relate to passenger seats. While the passenger seats are discussed for use with aircraft seats, they are by no means so limited. Rather, embodiments may be used in passenger seats or other seats of any type or otherwise as desired. For example, embodiments may be used on trains, buses, movie theaters, student seating, or any other instance when a seat may be useful.

Figure 1:
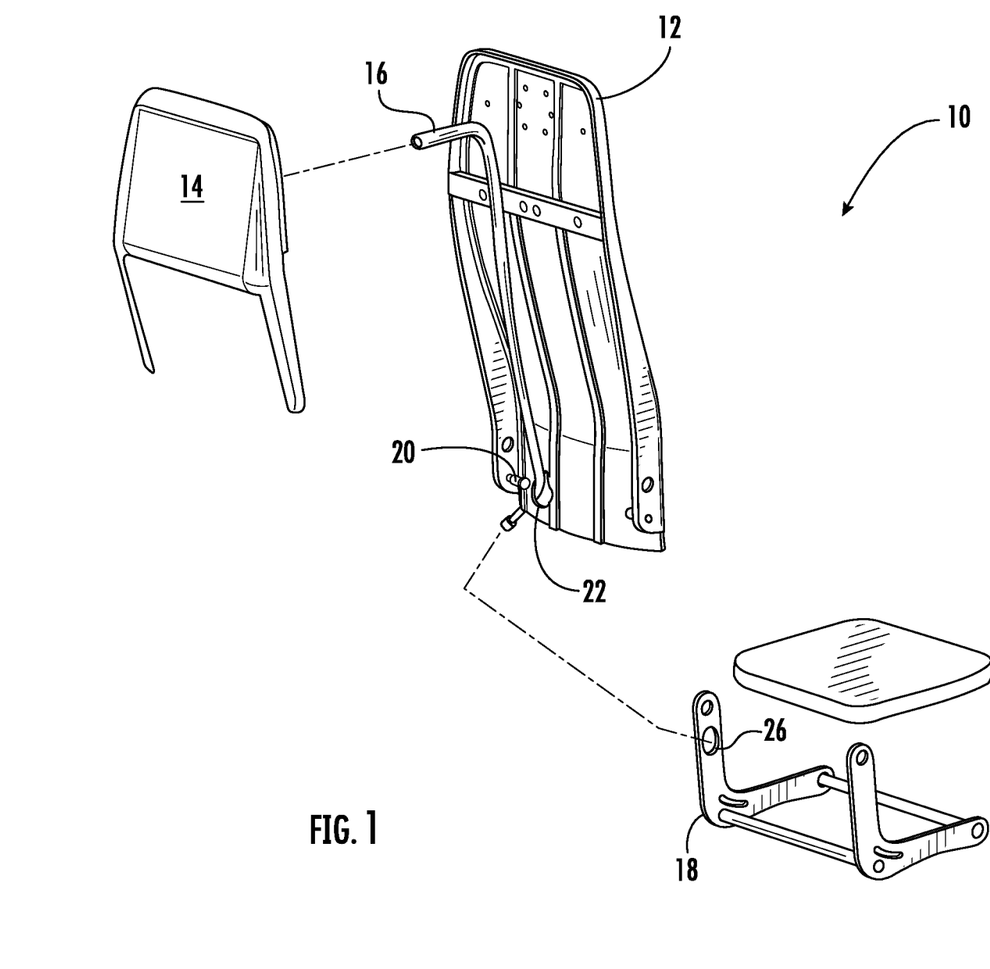
FIG. 1 is an exploded perspective view of components of a passenger seat with an entertainment system according to various embodiments of the present invention.

FIG. 1 illustrates exemplary embodiments of passenger seats 10 with a seat back 12 and an in-flight entertainment system ("IFE"). The IFE may be mounted to the seat back 12 in certain embodiments. In order to provide power and/or data connections to the IFE, a cable 16 is connected between the IFE and the aircraft electronics and/or power system. The cable 16 may be routed through the passenger seat 10 in a manner that may prevent, reduce, or otherwise mitigate stretching, compressing, pinching, or other modes of damaging the cable 16. For example, the cable 16 may be routed in a manner that mitigates damage that might otherwise be imparted as the seat back 12 moves among different states or configurations.

Respective elements of the seat back 12 may include suitable materials and/or features to facilitate various functions. For example, in various embodiments, the seat back 12 includes non-rigid or pliable materials (e.g., fabric, textiles, foam, or other cushioning material) for the comfort of passengers when supported in the passenger seat 10. Other more rigid materials may also be included, such as to reinforce pliable materials, or to provide components for other functions. For example, the seat back 12 on a rear side may include a shroud that is formed from rigid material and that is coupled with cushioning material of the seat back 12. Suitable examples of rigid material that may be used for the shroud and/or other components described herein include, but are not limited to, aluminum, stainless steel, aramid fibers, polycarbonate, polypropylene, other metallic materials, composite materials, or other similar materials. Respective components may be joined by suitable fasteners, which include but are not limited to screws, bolts, rivets, or other mechanical or chemical fasteners The seat back 12 can be supported by a frame structure such as a spreader 18. The seat back 12 may be pivotally attached to the spreader 18 and allow the seat back 12 to pivot relative to the spreader 18. For example, a pivot 20 (such as by a pin or tube) may couple the seat back 12 to the spreader 18.

Figure 2:
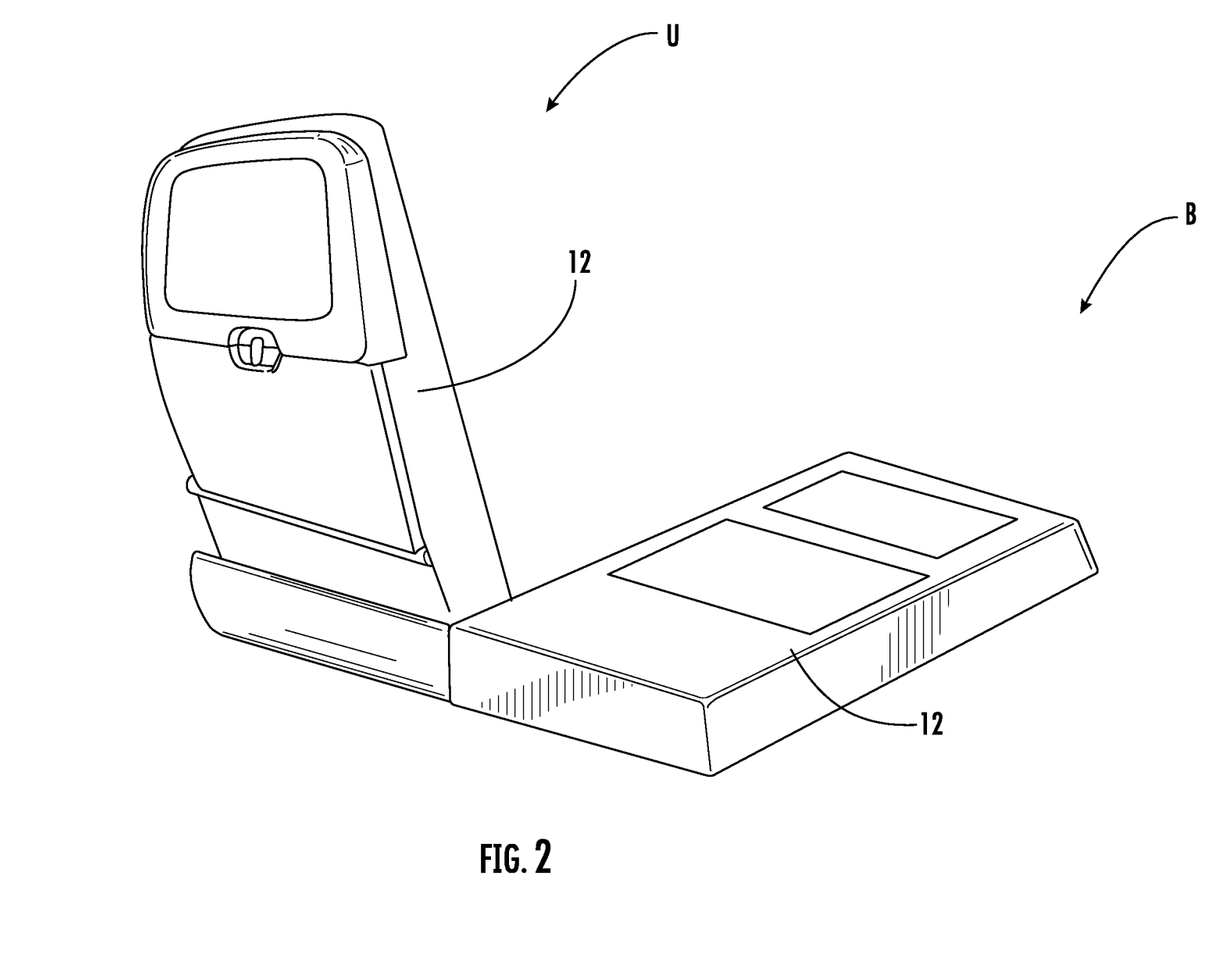
FIG. 2 is rear perspective of adjacent instances of the seat in FIG. 1 in different positions according to various embodiments.

The seat back 12 may move among different positions. For example, the seat back 12 may be movable between an upright configuration in which the seat back 12 is in a deployed position (e.g., at U in FIG. 2) and a break over configuration in which the seat back 12 is in a stowed position (e.g., at B in FIG. 2). In some examples, the seat back 12 rotates approximately 90° in a forward direction from the upright configuration to the break over configuration. The break over configuration, for example, may correspond to an orientation to which the seat back 12 may be moved to facilitate placement of a stretcher over the seat back 12. In various embodiments, the routing of the cable 16 may accommodate changes in position of a relevant portion of the seat back 12 that may occur as a result of shifting between the upright and break over configurations.

In certain embodiments (e.g., as in FIG. 1), the cable 16 is routed through a first opening or a first aperture 22 within the seat back 12. The first aperture 22 may correspond to a slot. In some embodiments, the first aperture 22 is less than 1" wide and more than 2.5" long or another suitable size to accommodate the cable 16 during movement of the seat back 12. The first aperture 22 may extend in a direction between a bottom of the seat back 12 and a top of the seat back. The first aperture 22 may be approximately aligned with the pivot 20 or a pivot axis of the seat back 12. In this context, approximately aligned may include a lower extremity of the first aperture 22 being no higher than a top of the pivot 20 or an upper extremity of the first aperture 22 being no lower than a bottom of the pivot 20. Additionally or alternatively, approximately aligned may include the first aperture 22 being proximate the pivot 20.

Figure 5:
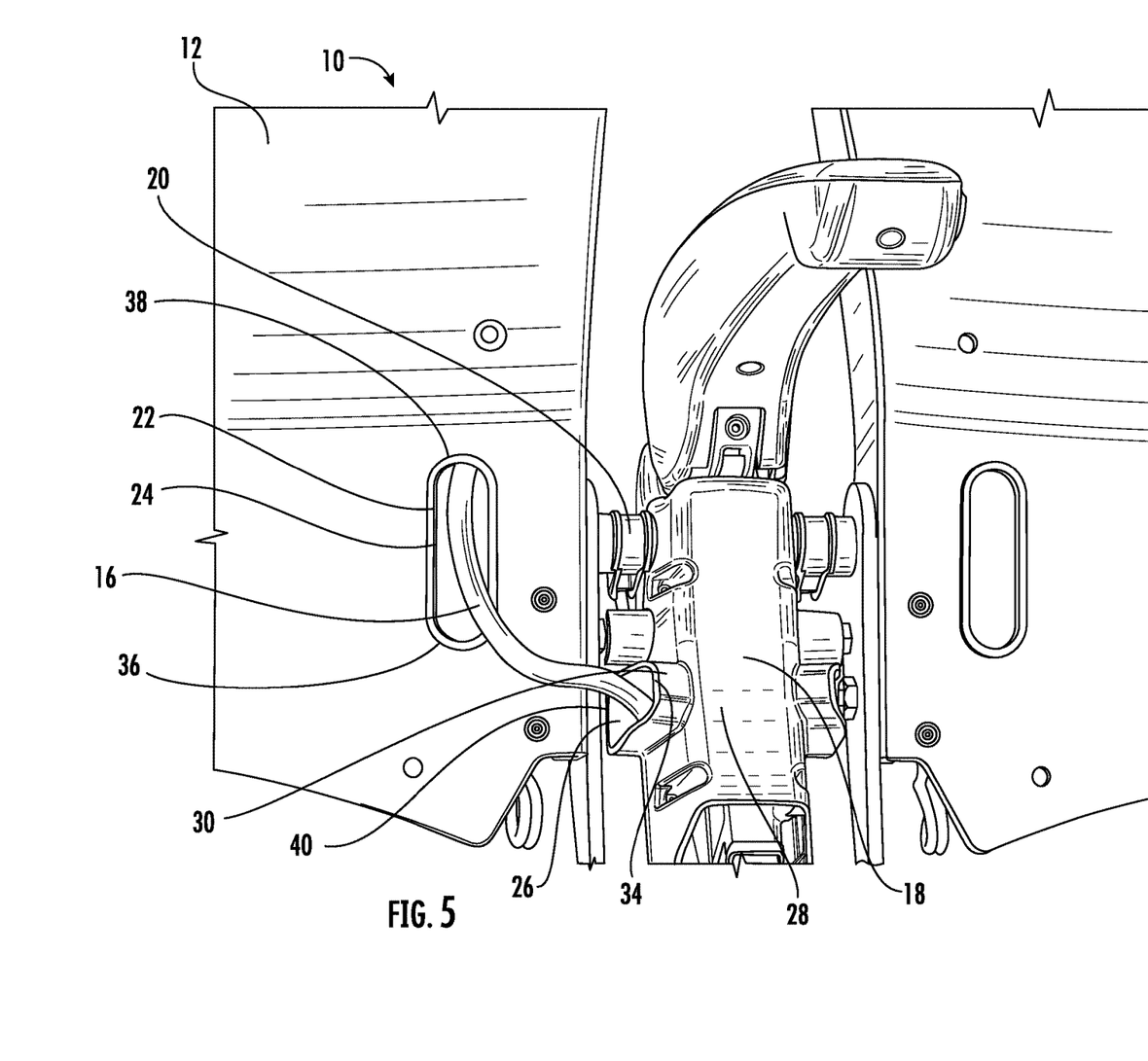
FIG. 5 is another perspective view of a portion of the seat of FIG. 1 with components in a first orientation according to various embodiments.
Figure 6:
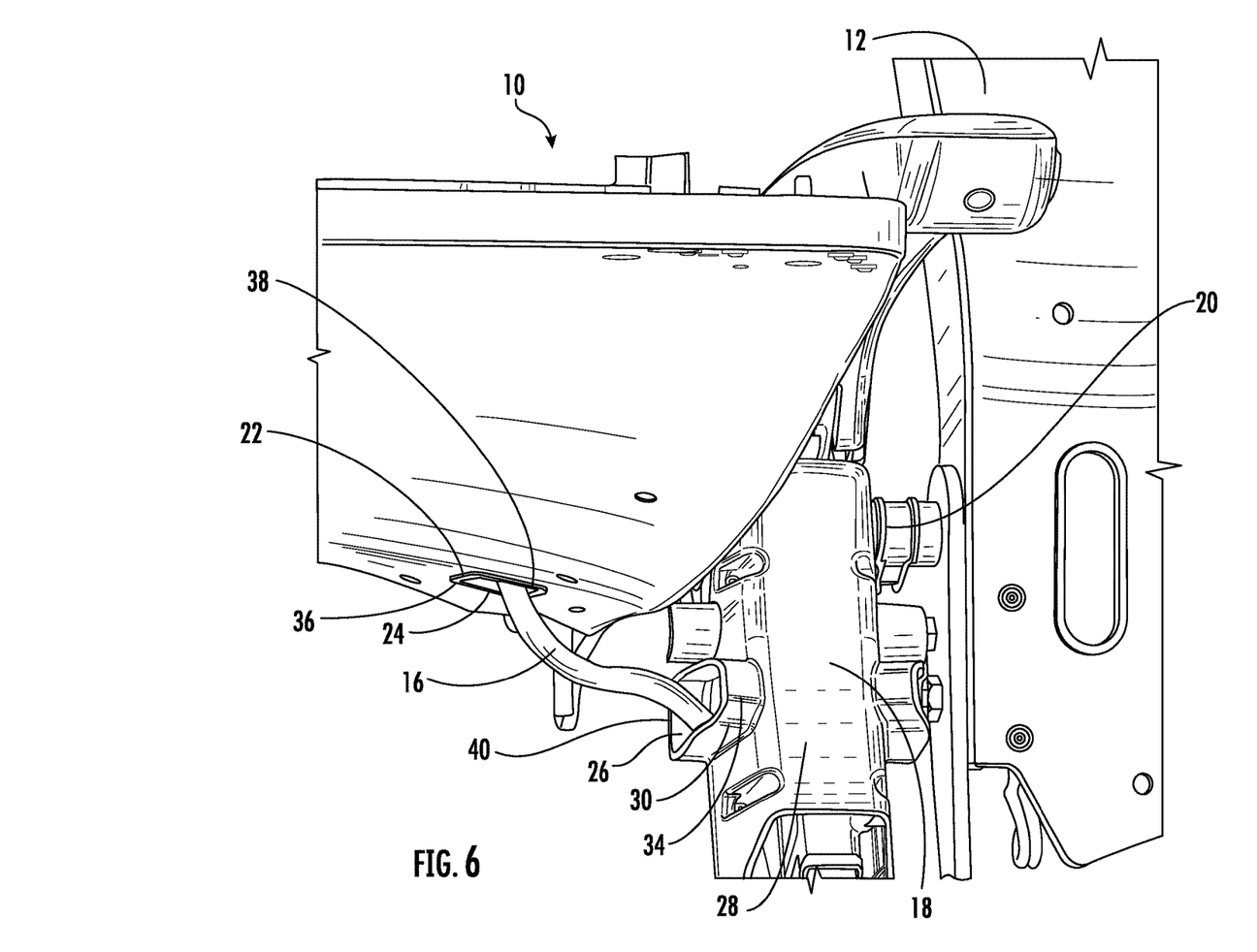
FIG. 6 is another perspective view of a portion of the seat of FIG. 1 with components in a second orientation according to various embodiments.

In some embodiments, the first aperture 22 corresponds to a through-hole. In some embodiments, as best illustrated in FIGS. 5-6, the first aperture 22 may include a grommet 24 within or adjacent the first aperture 22, for example, to facilitate routing of the cable 16. The cable 16 may be flexible, which may allow the cable 16 to be bent or contoured for routing as desired.

In some embodiments, the cable 16 may be routed through a second opening or a second aperture 26. The second aperture 26 may extend into or through the spreader 18 or an associated part. For example (such as in FIGS. 3 and 5), the second aperture 26 may extend through a spreader cover 28. The second aperture 26 may be disposed proximate to and/or approximately adjacent to an edge of the seat back 12 when in the upright configuration (e.g., as in FIGS. 3 and 5). In some embodiments, the first aperture 22 and/or the second aperture 26 are each sized to accommodate at least two cables 16, although other sizes could be utilized.

In some embodiments, the second aperture 26 is bounded at least partially by a flange 30. The flange 30 may extend away from a surface of the spreader cover 28 or other portion of the frame structure in which the second aperture 26 is located. The flange 30 may provide a guide for the cable 16 or a blunted surface that can reduce a risk of the cable 16 snagging or becoming cut.

The flange 30 may include an attachment member 32 on an outer surface of the flange 30. The attachment member 32 is depicted as a snap, but may correspond to any other fastener. Suitable examples, may include hook and loop fasteners, buttons or button holes, zippers, or magnets. The attachment member 32 may be utilized to secure a layer of fabric or other casing, for example, to obscure the cable 16 from view in use.

Figure 3:
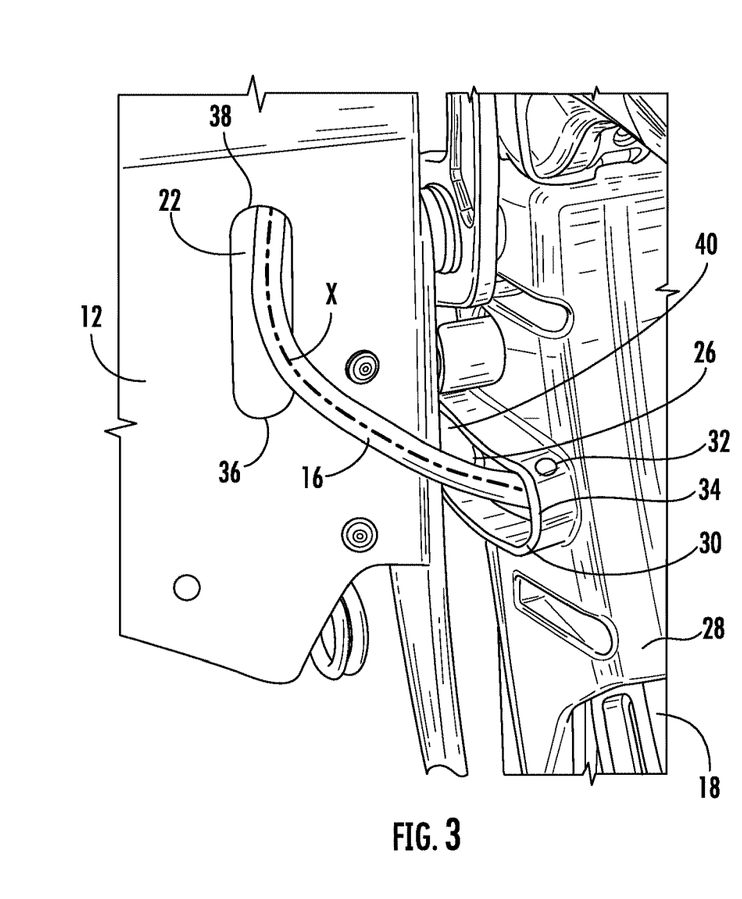
FIG. 3 is a detailed perspective view of a portion of the seat of FIG. 1 with components in a first orientation according to various embodiments.
Figure 4:
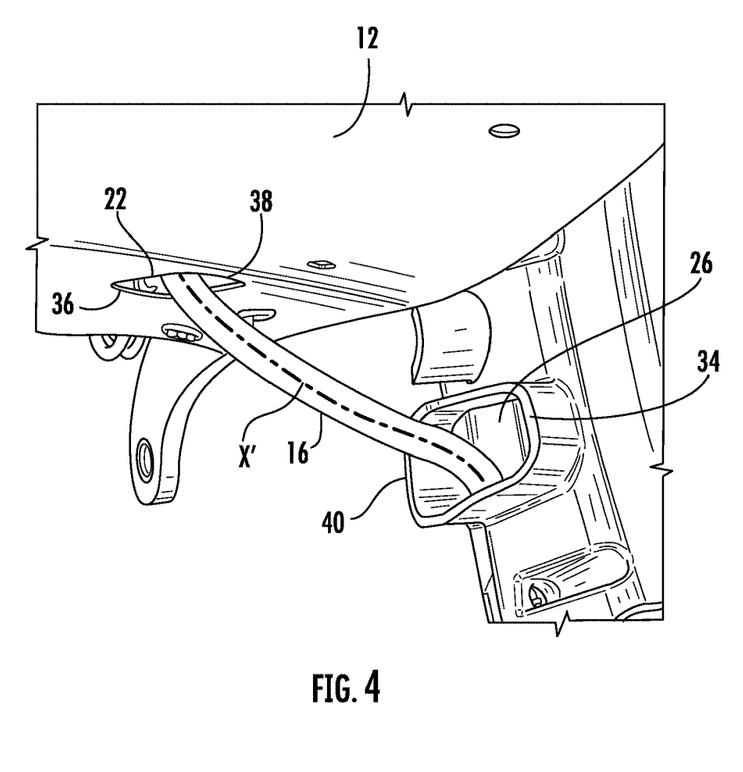
FIG. 4 is a perspective view of a portion of the seat of FIG. 1 with components in a second orientation according to various embodiments.

The first aperture 22 and the second aperture 26 can be sized, located, and/or otherwise arranged to facilitate protection of the cable 16 during movement of the seat back 12 among different positions. For example, the first aperture 22 and the second aperture 26 may be arranged such that the cable 16 has a length X between the first aperture 22 and the second aperture 26 in the upright configuration (such as illustrated in FIG. 3) and has a length X' between the first aperture 22 and the second aperture 26 in the break over configuration (such as in FIG. 4). During movement between the upright configuration (e.g., FIG. 3) and the break over configuration (FIG. 4), the cable 16 may be displaced or slide between the first aperture 22 and the second aperture 26. In certain embodiments, the length X and the length X' are approximately the same. In further embodiments, the length X and the length X' may differ by less than 5%.

The first aperture 22 and the second aperture 26 may be arranged to facilitate routing of the cable 16 in different states of the seat back 12. For example (as in FIGS. 3 and 5), a leading end 34 of the second aperture 26 may be forward of the seat back 12 and allow the cable 16 to pass along a front of the seat back 12 into the second aperture 26 in the spreader 18 even when the seat back 12 is in an upright position. The cable 16 may also abut or be arranged near a lower end 36 of the first aperture 22 in the upright position. An upper end 38 of the first aperture 22 may be above the lower end 36 in the upright position. A trailing end 40 of the second aperture 26 may be rearward or aft of the leading end 34 of the second aperture 26. The trailing end 40 may be forward, adjacent, or backward of the seat back 12 in the upright position. For example, placement of the trailing end 40 relative to the seat back 12 may be selected to facilitate particular motion paths when the seat back 12 is moving to the break over position.

As the seat back 12 is moved toward the break over position from the upright position, a distance between respective centers of the first aperture 22 and the second aperture 26 may change (e.g., increase) as a result of the first aperture 22 being relocated in response to movement of the seat back 12. However, respective ends of the first aperture 22 and the second aperture 26 may be arranged to facilitate routing without straining the cable 16. For example, as the seat back 12 moves from the upright position (e.g., FIGS. 3 and 5) to the break over position (e.g., FIGS. 4 and 6), the first aperture 22 in the seat back 12 and the second aperture 26 in the spreader cover 28 may shift position along the cable 16 (e.g., sliding along the cable 16 without straining the cable or displacing the cable 16 without affecting tension or compression in the cable 16). For example, before the movement of the seat back 12 (as in FIGS. 3 and 5), the cable 16 may be arranged near a lower end 36 of the first aperture 22 and a leading end 34 of the second aperture 26, whereas after movement (e.g., as in FIGS. 4 and 6), the cable 16 may be arranged near the upper end 38 of the first aperture 22 and near the trailing end 40 of the second aperture 26. More generally, the size of the first aperture 22 and the second aperture 26 may be selected so that the respective ends can move without straining the cable 16.

In the following, further examples are described to facilitate understanding of aspects of the invention:

Example A. A system for routing at least one cable for a passenger seat comprising:
  a first aperture in a seat back of the passenger seat;
  a second aperture in a frame structure of the passenger seat;
  an upright configuration wherein the seat back is in a deployed position; and
  a break over configuration wherein the seat back is in a stowed position;
  the at least one cable passing through the first aperture and the second aperture;
  wherein the at least one cable has a first length between the first aperture and the second aperture when the seat back is in an upright configuration;
  wherein the at least one cable has a second length between the first aperture and the second aperture when the seat back is in an upright configuration; and
  wherein the first length and the second length differ by less than 5%.

Example B. The system of Example A or any of the preceding or subsequent examples, wherein the second aperture extends through a spreader cover.

Example C. The system of Example A or any of the preceding or subsequent examples, wherein the first aperture comprises a slot.

Example D. The system of Example C or any of the preceding or subsequent examples, wherein the slot is less than 1 inch wide and greater than 2.5 inches long.

Example E. The system of Example C or any of the preceding or subsequent examples, wherein:
  the slot extends in a direction between a bottom of the seat back and a top of the seat back; and
  the slot is approximately aligned with a pivot axis of the seat back.

Example F. The system of Example A or any of the preceding or subsequent examples, wherein the second aperture comprises a flange extending away from a surface of the frame structure.

Example G. The system of Example F or any of the preceding or subsequent examples, wherein the second aperture comprises an attachment member on an outer surface of the flange.

Example H. The system of Example A or any of the preceding or subsequent examples, wherein the first aperture comprises a grommet.

Example I. The system of Example A or any of the preceding or subsequent examples, wherein the second aperture is disposed approximately adjacent to an edge of the seat back when the system is in the upright configuration.

Example J. The system of Example A or any of the preceding or subsequent examples, wherein the first aperture and the second aperture are each sized to accommodate at least two cables.

Example K. A passenger seat comprising:
  a seat back comprising a first aperture; and
  a spreader frame structure comprising a second aperture;
  wherein the seat back is pivotally attached to the spreader frame structure and configured to rotate between an upright configuration wherein the seat back is in a deployed position, and a break over configuration wherein the seat back is in a stowed position; and
  at least one cable passing through the first aperture and the second aperture;
  wherein the length of the at least one cable between the first aperture and the second aperture is approximately the same in the upright configuration and in the break over configuration.

Example L. The passenger seat of Example K or any of the preceding or subsequent examples, wherein the second aperture extends through a spreader cover.

Example M. The passenger seat of Example K or any of the preceding or subsequent examples, wherein the first aperture comprises a slot.

Example N. The passenger seat of Example M or any of the preceding or subsequent examples, wherein the slot is less than 1 inch wide and more than 2.5 inches long.

Example O. The passenger seat of Example M or any of the preceding or subsequent examples, wherein:
  the slot extends in a direction between a bottom of the seat back and a top of the seat back; and
  the slot is approximately aligned with a pivot axis of the seat back.

Example P. The passenger seat of Example K or any of the preceding or subsequent examples, wherein the second aperture comprises a flange extending away from a surface of the spreader frame structure.

Example Q. The passenger seat of Example P or any of the preceding or subsequent examples, wherein the second aperture comprises an attachment member on an outer surface of the flange.

Example R. The passenger seat of Example K or any of the preceding or subsequent examples, wherein the first aperture comprises a grommet.

Example S. The passenger seat of Example K or any of the preceding or subsequent examples, wherein the second aperture is disposed approximately adjacent to an edge of the seat back when the passenger seat is in the upright configuration.

Example T. The passenger seat of Example K or any of the preceding or subsequent examples, wherein the seat back rotates approximately 90° in a forward direction from the upright configuration to the break over configuration.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the That which is claimed is:

1. A system for routing at least one cable for a passenger seat comprising:
   a first aperture in a seat back of the passenger seat;
   a second aperture in a frame structure of the passenger seat;
   an upright configuration wherein the seat back is in a deployed position; and
   a break over configuration wherein the seat back is in a stowed position;
   the at least one cable passing through the first aperture and the second aperture;
   wherein the at least one cable has a first length between the first aperture and the second aperture when the seat back is in an upright configuration;
   wherein the at least one cable has a second length between the first aperture and the second aperture when the seat back is in a break over configuration; and
   wherein the first length and the second length differ by less than 5%,
   wherein the second aperture is disposed approximately adjacent to an edge of the seat back when the system is in the upright configuration.

2. The system of claim 1, wherein the second aperture extends through a spreader cover.

3. The system of claim 1, wherein the first aperture comprises a slot.

4. The system of claim 3, wherein the slot is less than 1 inch wide and greater than 2.5 inches long.

5. The system of claim 3, wherein:
   the slot extends in a direction between a bottom of the seat back and a top of the seat back; and
   the slot is approximately aligned with a pivot axis of the seat back.

6. The system of claim 1, wherein the second aperture comprises a flange extending away from a surface of the frame structure.

7. The system of claim 6, wherein the second aperture comprises an attachment member on an outer surface of the flange.

8. The system of claim 1, wherein the first aperture comprises a grommet.

9. The system of claim 1, wherein the first aperture and the second aperture are each sized to accommodate at least two cables.

10. The passenger seat of claim 1, wherein the seat back rotates approximately 90° in a forward direction from the upright configuration to the break over configuration.

* * * * *